United States Patent

Yamaguchi (10) Patent No.: US 8,911,239 B2
(45) Date of Patent: Dec. 16, 2014

(54) ROTATABLE CONNECTOR DEVICE

(71) Applicants: Furukawa Electric Co., Ltd., Tokyo (JP); Furukawa Automotive Systems Inc., Shiga (JP)

(72) Inventor: Akio Yamaguchi, Shiga (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 46 days.

(21) Appl. No.: 13/898,169

(22) Filed: May 20, 2013

(65) Prior Publication Data

US 2013/0252441 A1  Sep. 26, 2013

Related U.S. Application Data

(63) Continuation of application No. PCT/JP2011/076762, filed on Nov. 21, 2011.

(30) Foreign Application Priority Data

Nov. 19, 2010  (JP) ................................ 2010-258899

(51) Int. Cl.
  *H01R 39/00*  (2006.01)
  *H01R 35/04*  (2006.01)
  *B60R 16/027*  (2006.01)
  *H01R 35/02*  (2006.01)

(52) U.S. Cl.
  CPC .............. *H01R 35/04* (2013.01); *B60R 16/027* (2013.01); *H01R 35/025* (2013.01); *H01R 2201/26* (2013.01)
  USPC ........................................... 439/15; 439/164

(58) Field of Classification Search
  CPC .. H01R 35/025; H01R 2201/26; H01R 39/00; H01R 43/002; H01R 35/04; B60R 16/0207; B60R 16/027
  USPC ....................................... 439/11–15, 164, 534
  See application file for complete search history.

(56) References Cited

U.S. PATENT DOCUMENTS 5,593,310 A * 1/1997 Kawamoto et al. ........... 439/164
7,223,104 B2 * 5/2007 Suenaga ......................... 439/15

(Continued)

FOREIGN PATENT DOCUMENTS

| JP | 2001-126836 A | 5/2001 |
| JP | 2009-152089 A | 7/2009 |
| JP | 2010-129285 A | 6/2010 |

OTHER PUBLICATIONS

International Search Report issued in Application No. PCT/JP2011/076762, dated Dec. 20, 2011 (1 page).

*Primary Examiner* — Briggitte R Hammond
(74) *Attorney, Agent, or Firm* — Osha Liang LLP (57) ABSTRACT

A rotatable connector device includes a rotator and a stator which are fit to each other so as to be rotatable with respect to each other. The rotator and the stator form an accommodation space. In a bottom part of the accommodation space, a retainer for axially supporting a plurality of rotatable rollers and a flat cable are accommodated. A guide unit for allowing a reversed part to be pressed thereon is fit and fixed to the retainer. In a vertical cross-section vertical to a planar surface of the retainer, a guide surface of the guide unit which faces the reversed part has a vertical cross-sectional shape which does not contact a prescribed range of the flat cable in a width direction of the flat cable.

8 Claims, 11 Drawing Sheets

(56) References Cited

U.S. PATENT DOCUMENTS

| | | | |
|---|---|---|---|
| 7,393,222 B2 * | 7/2008 | Asakura | 439/164 |
| 7,934,931 B2 * | 5/2011 | Kuroda et al. | 439/15 |
| 8,382,500 B2 * | 2/2013 | Adachi | 439/164 |
| 8,740,626 B2 * | 6/2014 | Sakurai et al. | 439/15 |

* cited by examiner

ROTATABLE CONNECTOR DEVICE

TECHNICAL FIELD

The present invention relates to a rotatable connector device for electrically connecting elements on the side of a steering wheel of, for example, an automobile and a vehicle body side to each other.

BACKGROUND ART

A rotatable connector device which is mountable on a vehicle such as an automobile or the like includes a stator fixed to a vehicle body and a rotator attached to a steering wheel. The stator and the rotator are coaxially attached to each other so as to be rotatable with respect to each other. The rotatable connector device further includes flat cables located in an accommodation space formed by the stator and the rotator.

The flat cables electrically connect electric components such as a horn module, an airbag module, an audio control module and the like provided on the side of the steering wheel and a power supply on the side of the vehicle body to each other.

Patent Document 1 filed by the present applicant, for example, proposes a rotatable connector device including a retainer, located on a bottom surface of the accommodation space, for guiding the flat cables to rotate around an axis of the steering wheel.

Such a retainer includes a plurality of rotatable rollers and a guide unit (corresponding to a "guide wall" in Patent Document 1) projecting in the vicinity of one of the rotatable rollers. The retainer assists the flat cables in being rotated in the accommodation space in a winding or rewinding direction, so that the rotatable connector device can follow the steering operation to rotate smoothly.

Figure 11:
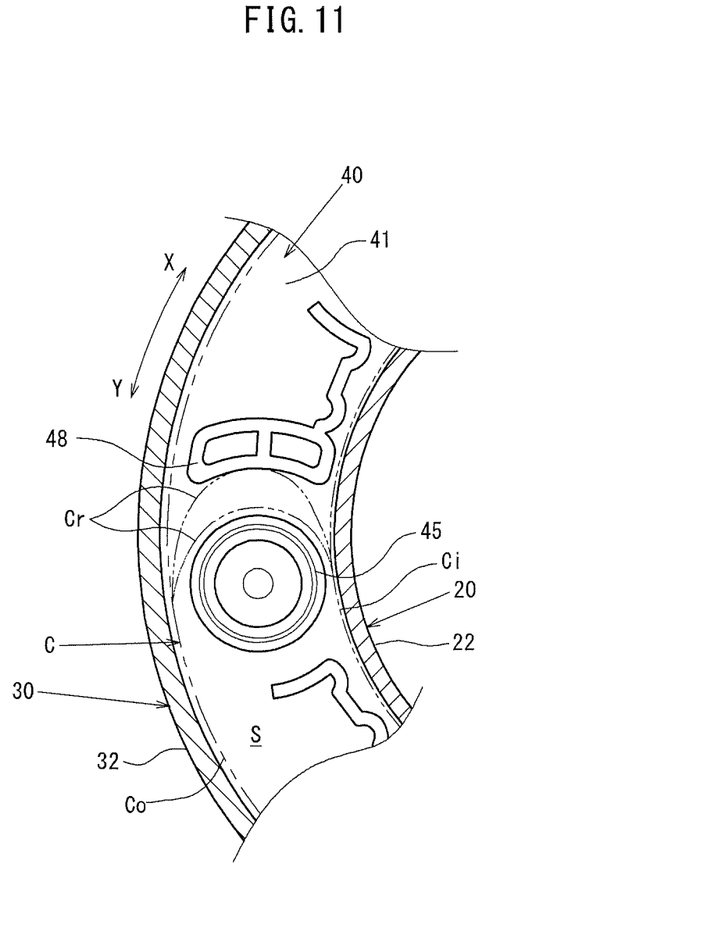
FIG. 11 is a plan view showing a guide unit of the conventional art.

This will be described in more detail. As shown in FIG. 11, flat cables C include, in the accommodation space S, an outside wound part Co wound along an inner circumferential surface of an outer cylindrical section 32 of the stator 30, a reversed part Cr which is wound along one of the plurality of rotatable rollers 45 axially supported by a retainer 40 and turned around in a U shape, and an inside wound part Ci wound along an outer circumferential surface of an inner cylindrical section 22 of the rotator 20.

In the rotatable connector device having such a structure, when the rotator 20 is rotated clockwise (X direction in FIG. 11), the reversed part Cr of the flat cables C is pressed on a guide unit 48, and the pressing force causes the retainer 40 to rotate in the clockwise direction. When the rotor is rotated in a counterclockwise direction (Y direction in FIG. 11), the reversed part Cr of the flat cables C is pulled counterclockwise along the rotatable roller 45, and thus the retainer 40 is rotated counterclockwise.

In such a structure, when the rotator 20 is rotated clockwise, the reversed part Cr of the flat cables C always receives a reaction force from the guide unit 48. Therefore, a laminate structure of the flat cables C on the guide unit 48 side may be abraded by the repeated rotation of the rotator 20, which may cause a fault.

CITATION LIST

Patent Literature

Patent Document 1: Japanese Laid-Open Patent Publication No. 2010-129285

SUMMARY OF INVENTION

Technical Problem

The present invention, in light of the above problem, has an object of providing a rotatable connector device capable of preventing abrasion of a cover of a flat cable in at least a prescribed range.

Solution to Problem

The present invention is directed to a rotatable connector device including a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the fixed-side ring plate, the rotator and the stator being fit to each other so as to be rotatable with respect to each other in a clockwise direction and a counterclockwise direction. An accommodation space is defined by the rotatable-side ring plate and the inner cylindrical section of the rotator and the fixed-side ring plate and the outer cylindrical section of the stator; a ring-shaped retainer for axially supporting a plurality of rotatable rollers is located on a bottom surface of the accommodation space; in a part of the accommodation space above the retainer, a flat cable for electrically connecting the rotator and the stator to each other, the flat cable having a reversed part which is wound along one of the plurality of rotatable rollers and has a winding direction thereof reversed, are accommodated along the rotatable rollers, such that the flat cable is wound and rewound; a guide unit for allowing the reversed part to be pressed thereon is fit and fixed to the retainer; and in a vertical cross-section vertical to a planar surface of the retainer, a guide surface of the guide unit which faces the reversed part has a vertical cross-sectional shape which does not contact with at least a prescribed range of the flat cable in a width direction of the flat cable.

According to the present invention, abrasion of a cover of the flat cable can be prevented in at least a prescribed range.

This will be described more specifically. The guide unit is fit and fixed to the retainer; namely, the guide unit is formed separately from the retainer. Owing to this, the guide unit can have a shape having the guide surface, which is difficult in the case where the guide unit is molded integrally with the retainer as by a conventional method. Therefore, at least a prescribed range of the reversed part of the flat cable can be prevented from contacting the guide surface.

In the case where, for example, the prescribed range of the flat cable is at a center in the width direction thereof, the vertical cross-sectional shape of the guide surface has a curved and concaved shape having a recess in a middle part. The guide unit having such a shape is difficult to be formed integrally with the retainer by molding so as to project from the retainer as by a conventional method, due to a reason related to molding. By contrast, in the case where the guide unit is formed separately from the retainer, the freedom of molding is improved and therefore the guide unit may have such a complicated shape.

The guide unit merely needs to be fit and fixed to the retainer and does not need to be completely separate from the retainer. For example, the guide unit may be formed as being coupled to the retainer by a thin band-like member and put into a folded state to be fit and fixed to the retainer.

Since the guide unit is formed separately from the retainer, the guide unit can be shaped such that the guide surface is prevented from contacting the prescribed range of the flat cable. In addition, the guide unit may be formed to have an inclining part such that the pressing force of the reversed part does not escape and the retainer is rotated smoothly.

Therefore, when the flat cable is wound or unwound, there is no risk that the cover in the prescribed range of the flat cable is abraded as a result of rubbing against the guide surface. Thus, the conductors can be prevented from being broken.

Namely, since the guide unit is formed separately from the retainer, the contact range and the contact position of the flat cable and the guide surface, and also the position of abrasion of the flat cable, can be controlled. Therefore, abrasion of the cover of the flat cable can be prevented in at least the prescribed range.

In an embodiment according to the present invention, the prescribed range may be a non-contact range; a range of the flat cable excluding the non-contact range in the width direction may be set as a contact range; the vertical cross-sectional shape of the guide surface facing the contact range of the reversed part may be formed to be a plane which is in line contact with the reversed part and is generally vertical to the top surface of the retainer; and the generally vertical plane of the guide surface may be formed to swell toward the flat cable.

According to the present invention, the guide unit can catch the flat cable more stably, and can be prevented from contacting the non-contact range of the flat cable. Therefore, the risk that the cover of the flat cable is abraded can be reduced in at least the non-contact range.

In an embodiment according to the present invention, a parting line of a plurality of dies used to form the guide unit by molding may be set on a guide unit main body excluding at least the guide surface and ends of the guide surface.

According to the present invention, the parting line of the molding dies is not on the guide surface or the ends thereof. Therefore, molding burr or step which is likely to be generated on the parting line of the guide unit can be prevented from rubbing against the reversed part of the flat cable. Although a part of the reversed part contacts the guide surface, an area of such a part which is close to the non-contact range does not rub against the parting line. Therefore, the risk that the cover of the flat cable is abraded can be reduced in at least the non-contact range.

In addition, there is no possibility that the molding burr generated on the parting line of the molding dies rubs against the reversed part and comes off. Therefore, there is no risk that the flat cable is wound and unwound while having the burr attached thereto and thus the cover of the flat cable is broken.

In an embodiment according to the present invention, a plurality of conductors included in each of the flat cable may be each assigned a priority level in accordance with an electric part electrically connected to the respective conductor; the conductors may be located in accordance with the priority levels; and the non-contact range may be set to a range in which the conductors having higher priority levels are located.

The electric part may be an electric component such as an airbag module, a horn module, an audio control module or the like provided on the side of the steering wheel.

Among the electric components provided on the side of the steering wheel, the airbag module, the horn module and the like, which are highly important for the running of the vehicle, may be assigned a higher priority level than the audio control module, the air conditioner control module and the like, which do not hinder the running even if being inoperable.

The highly important electric components may be all assigned the same priority level. The conductors may be located sequentially in accordance with the priority levels to form the flat cable. Alternatively, the conductors may be located discretely in accordance with the type and priority level of the electric parts connected thereto, to form the flat cable.

A range in which the conductors assigned a high priority level are located may include a conductor assigned a low priority level adjacent to the conductors assigned a high priority level. A border between a range in which the conductors assigned a high priority level are located and a range in which the conductors assigned a low priority level are located may be the position of a conductor, an end of the flat cable, or a position between conductors.

According to the present invention, a range in which the conductors assigned a high priority level, among the plurality of conductors included in the flat cable, are located, namely, a range in which the conductors connected to the highly important electric parts are located, can be prevented from contacting the guide surface.

This will be described more specifically. It is now assumed that a plurality of conductors connected to the highly important electric parts, among a plurality of conductors included in the flat cable, are located close to each other. If big electric noise is caused to one of the conductors, the important electric parts connected to the adjacent conductors may be influenced in the operation. In order to avoid such a problem, the conductors connected to important electric parts may be located discretely.

The conductors included in the flat cable are each assigned a priority level in accordance with the level of importance of the electric part connected thereto. Thus, the range in which the conductors assigned a high priority level are located can be set as a range which is prevented from contacting the guide surface.

Thus, the prescribed range can be set easily, and abrasion of the flat cable can be prevented in a range in which the conductors connected to highly important electric parts are located.

The electric parts may be each assigned a priority level in advance, so that the conductors may be each assigned the same priority level as that of the electric parts connected thereto. In this manner, the same electric part or the electric part having the same role is always assigned the same priority level. Thus, the conductors are prevented from being assigned a wrong priority level.

Advantageous Effects of Invention

According to the present invention, a rotatable connector device capable of preventing abrasion of a cover of a flat cable in at least a prescribed range.

DESCRIPTION OF EMBODIMENTS

Hereinafter, an embodiment of the present invention will be described with reference to the drawings.

Figure 1:
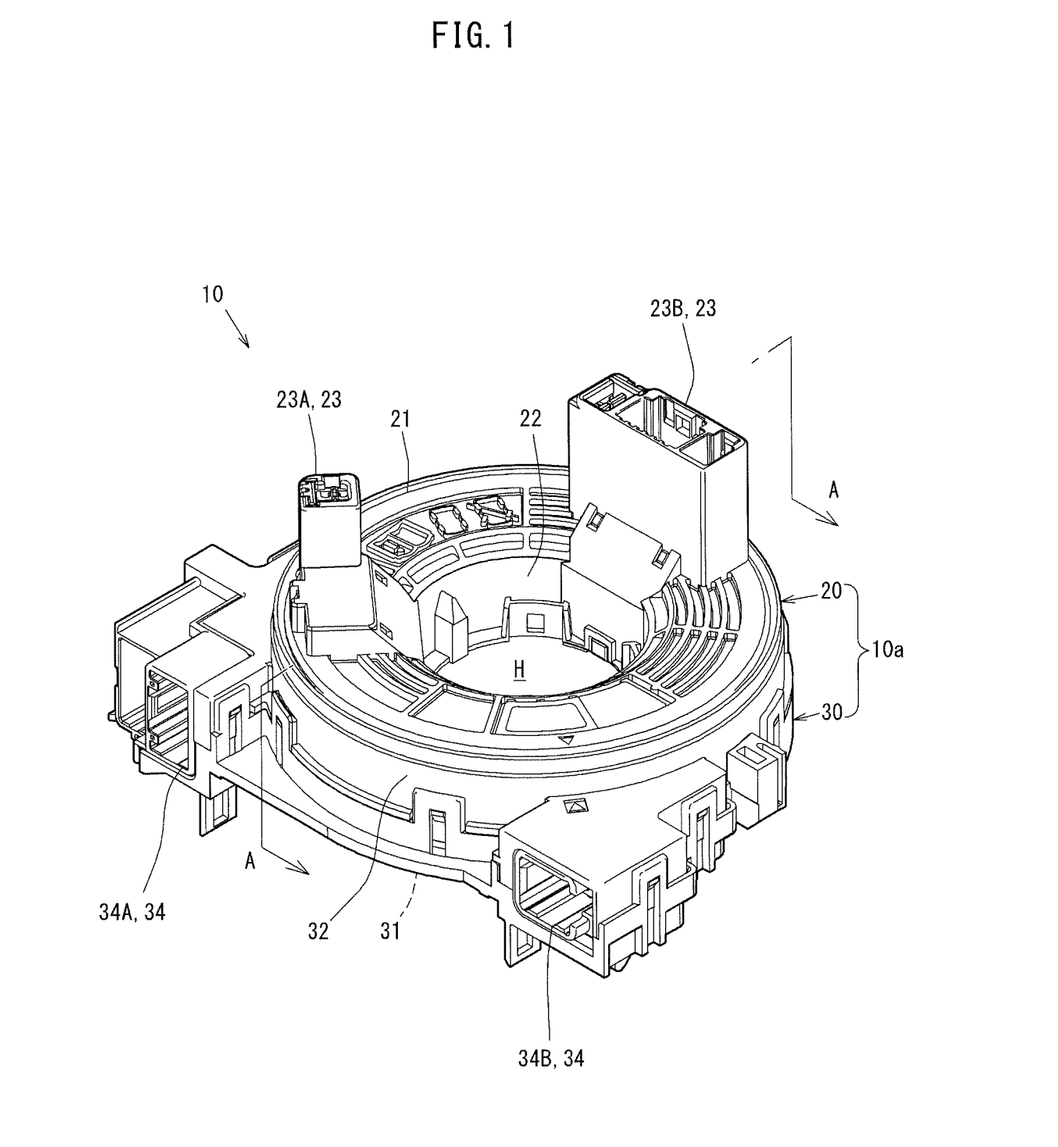
FIG. 1 is an isometric view showing an external appearance of a steering roll connector in an embodiment.
Figure 2:
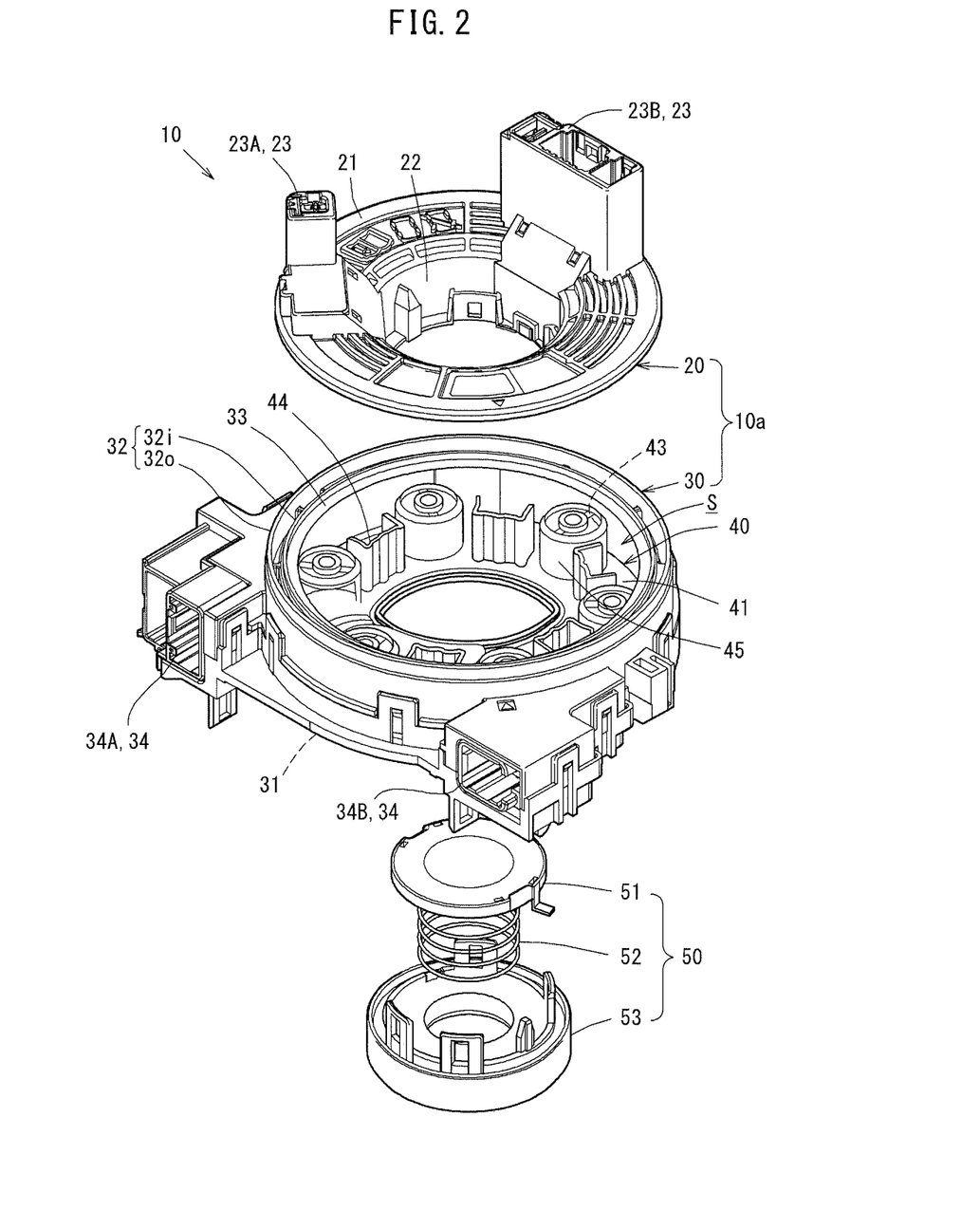
FIG. 2 is an exploded isometric view showing an exploded state of the steering roll connector in the embodiment.
Figure 3:
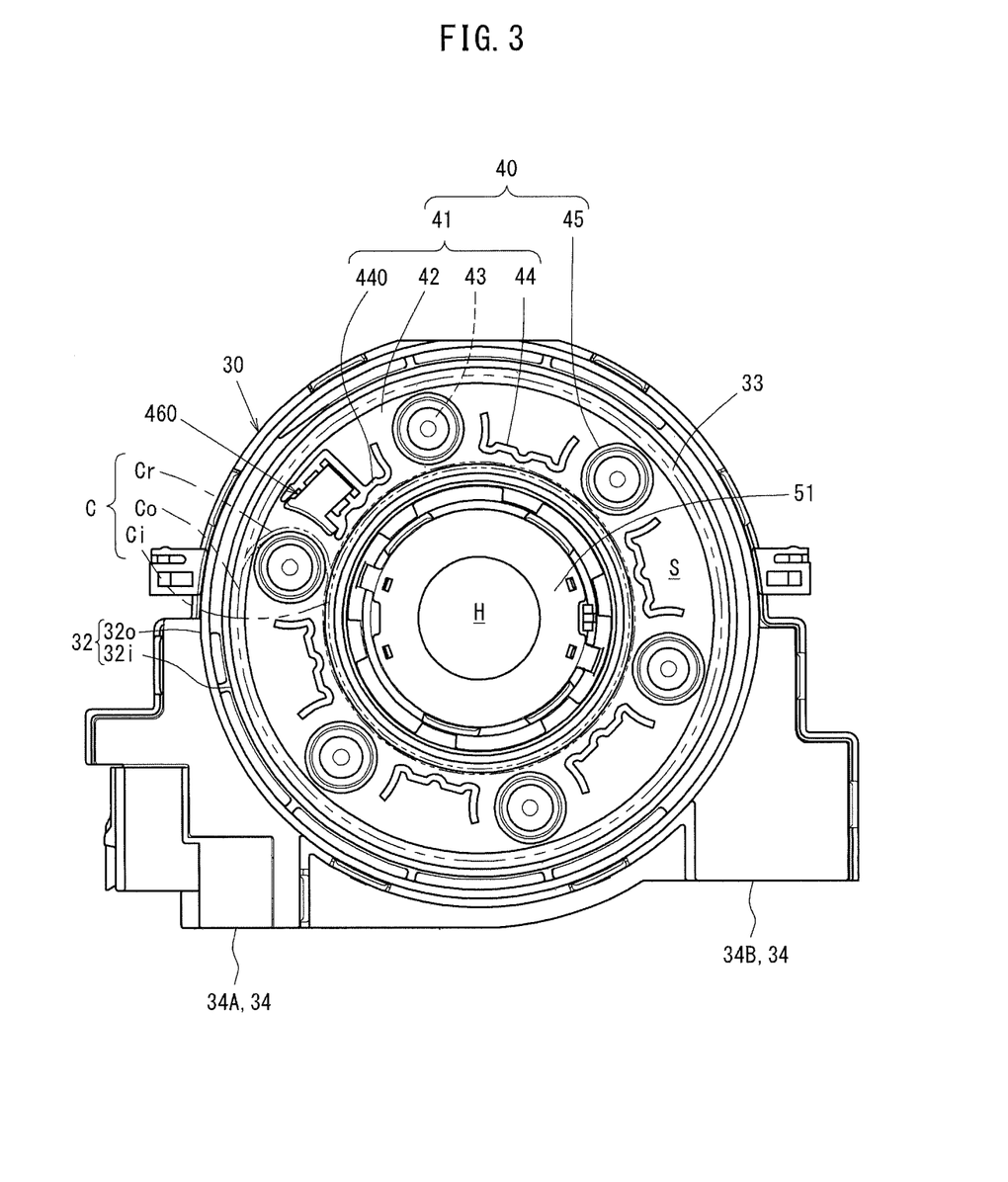
FIG. 3 is a plan view of the steering roll connector in the embodiment in the state where a rotator has been detached.
Figure 4:
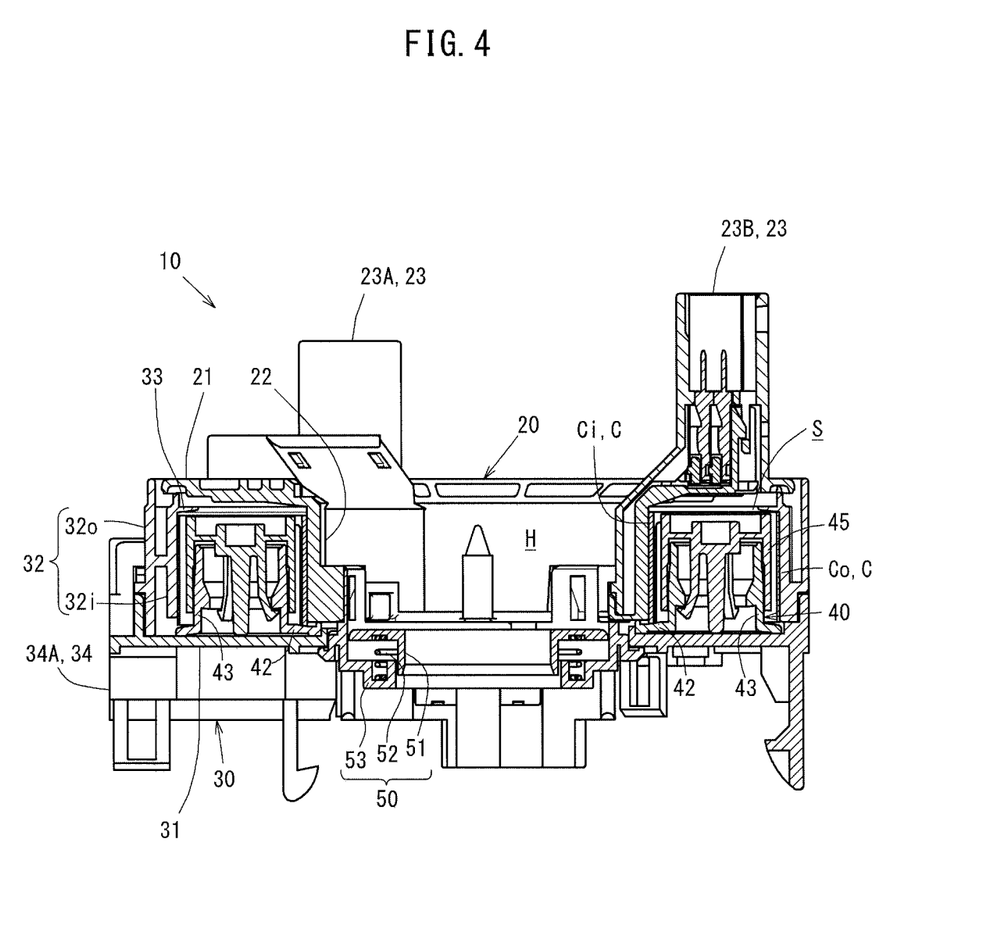
FIG. 4 is a cross-sectional view taken along line A-A in FIG. 1.
Figure 5:
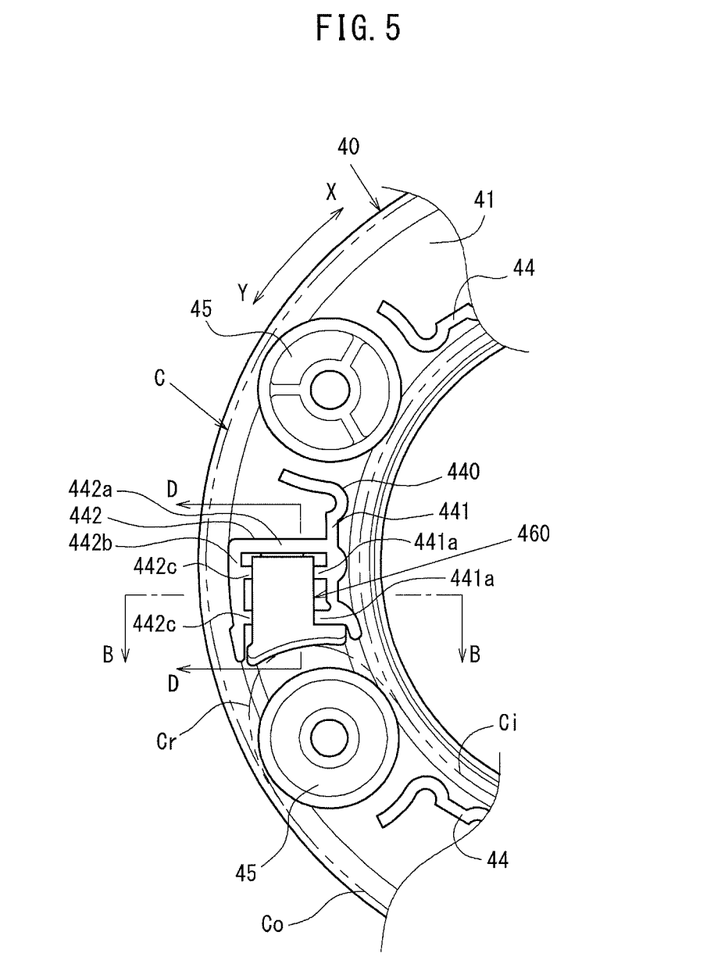
FIG. 5 is a plan view showing an external appearance of a guide unit and the vicinity thereof.
Figure 6:
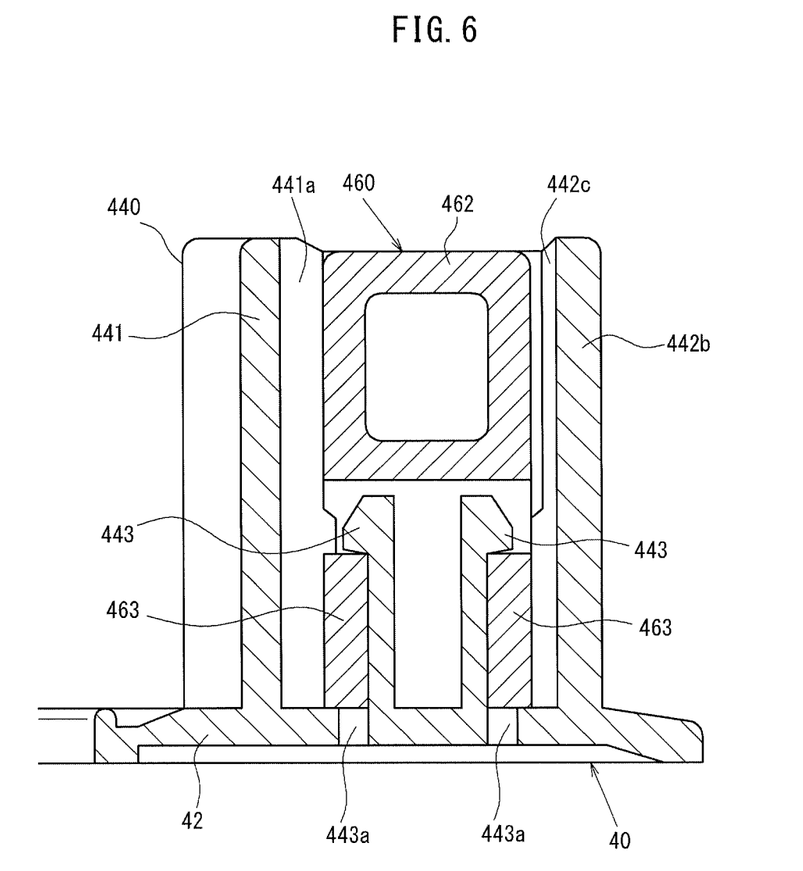
FIG. 6 is a cross-sectional view taken along line B-B in FIG. 5.
Figure 7:
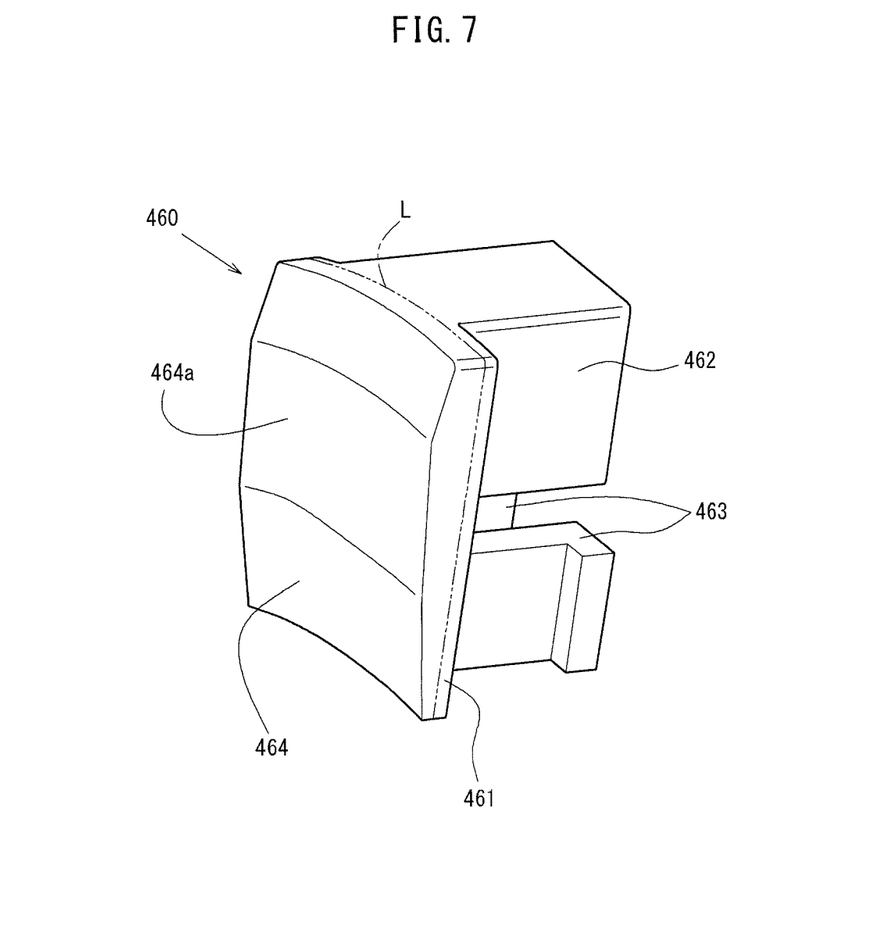
FIG. 7 is an isometric view showing an external appearance of the guide unit.
Figure 8:
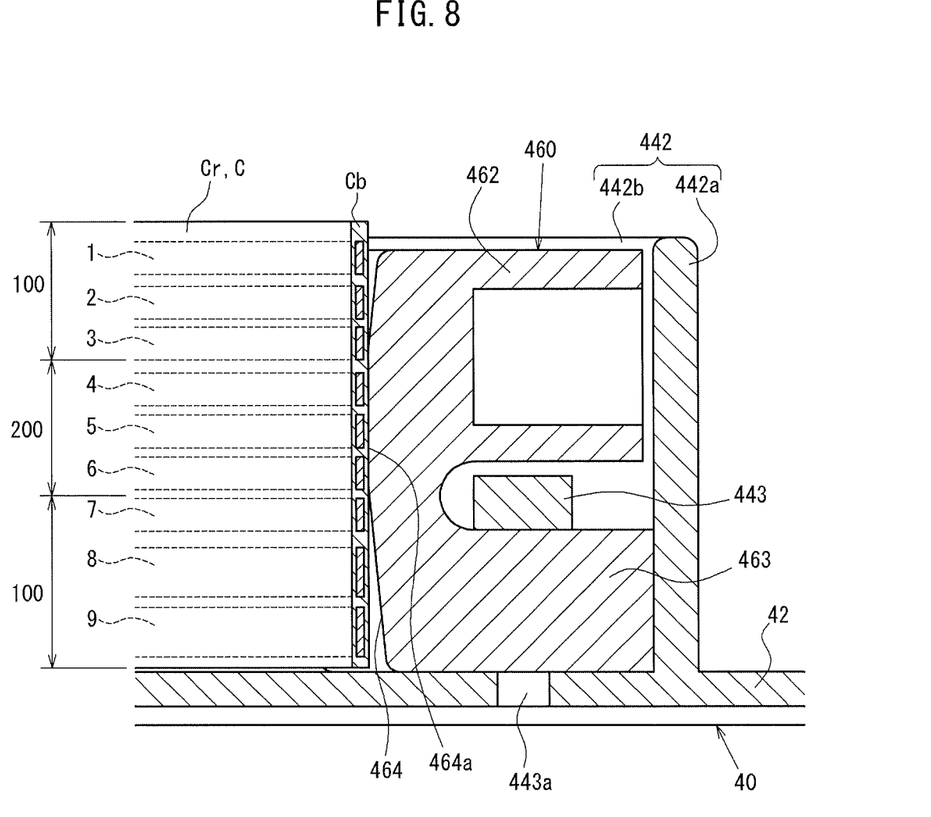
FIG. 8 is a cross-sectional view taken along line D-D in FIG. 5.

FIG. 1 is an isometric view showing an external appearance of a steering roll connector 10 in this embodiment. FIG. 2 is an exploded isometric view showing an exploded state of the steering roll connector 10 in this embodiment. FIG. 3 is a plan view of the steering roll connector 10 in this embodiment in the state where a rotator 20 has been detached. FIG. 4 is a cross-sectional view taken along line A-A in FIG. 1. FIG. 5 is a plan view showing an external appearance of a guide unit 460 and the vicinity thereof. FIG. 6 is a cross-sectional view taken along line B-B in FIG. 5. FIG. 7 is an isometric view showing an external appearance of the guide unit 460. FIG. 8 is a cross-sectional view taken along line D-D in FIG. 5. In FIG. 5, the rotator 20 and the stator 30 are omitted.

As shown in FIG. 1 through FIG. 4, the steering roll connector 10 in this embodiment includes a cable housing 10a, a retainer 40, and a rotation lock structure 50.

As shown in FIG. 3 and FIG. 4, the cable housing 10a is generally cylindrical and has an insertion hole H running through the cable housing 10a in a rotation axis direction of a steering wheel (up-down direction in FIG. 4). The insertion hole H is formed at a central part of the cable housing 10a as seen in a plan view. The insertion hole H is formed to have a diameter which allows a steering shaft (not shown) projecting from a steering column (not shown) to be inserted thereto. The cable housing 10a includes the stator 30 and the rotator 20 which are rotatable with respect to each other.

At a top end of the steering shaft, the steering wheel for making a rotation operation is fixed.

As shown in FIG. 2, the rotation lock structure 50 includes a lock body 51, a spring receiving sleeve 53, and a return spring 52 provided between the lock body 51 and the spring receiving sleeve 53.

By pressing up the spring receiving sleeve 53 against an urging force of the return spring 52, the rotator 20 can be locked by means of the lock body 51 so as not to be rotated with respect to the stator 30. Alternatively, by inserting a boss section (not shown) of a core bar of the steering wheel into the lock structure 50, the rotator 20 can be released from the locked state provided by the lock body 51 and is permitted to be freely rotatable with respect to the stator 30.

As shown in FIG. 2, the rotator 20 includes a rotatable-side ring plate 21 formed to be ring-shaped and acting as a top plate, and an inner cylindrical section 22 having a cylindrical shape and extending downward from an inner circumferential edge of the rotatable-side ring plate 21.

The rotator 20 is fixed to, and is rotatable integrally with, the steering wheel. In more detail, the rotator 20 can rotate around the same axis as the rotation axis of the steering wheel.

To the rotator 20, rotator-side connectors 23 rotatable integrally with the rotator 20 along with the rotation thereof are attached.

The rotator-side connectors 23 include a first rotator-side connector 23A and a second rotator-side connector 23B. The first rotator-side connector 23A and the second rotator-side connector 23B are located with a prescribed distance kept therebetween in a circumferential direction of the rotatable-side ring plate 21, and connection openings thereof are directed upward.

The rotator-side connectors 23 (23A, 23B) are each connected to a cable (not shown) drawn from an electrical circuit of, for example, a horn switch, an airbag unit or the like attached to the steering wheel.

The stator 30 is fixed to an appropriate member on the side of a vehicle body, for example, a combination bracket switch (not shown) located inside the steering column so as to be rotatable with respect to the steering wheel. As shown in FIG. 2, the stator 30 includes a fixed-side ring plate 31 formed to be ring-shaped and acting as a bottom plate, and an outer cylindrical section 32 having a cylindrical shape and extending upward from an outer circumferential edge of the fixed-side ring plate 31. The outer circumferential edge of the fixed-side ring plate 31 and a bottom end of the outer cylindrical section 32 are fit to each other to be integral.

As shown in FIG. 3 and FIG. 4, the outer cylindrical section 32 has a radial-direction two-layer structure including an outside outer cylindrical section 32o having a cylindrical shape and an inside outer cylindrical section 32i having a cylindrical shape. The inside outer cylindrical section 32i has a slightly shorter diameter than a diameter of the outside outer cylindrical section 32o. The outside outer cylindrical section 32o and the inside outer cylindrical section 32i are located concentrically and face each other in a radial direction closely to each other.

As shown in FIG. 4, the inside outer cylindrical section 32i has a brim-like guide projection piece 33 in a top portion thereof. The guide projection piece 33 projects inward in the radial direction (radially inner direction) and guides flat cables C described later from above.

To the stator 30, stator-side connectors 34 are attached.

The stator-side connectors 34 include a first stator-side connector 34A and a second stator-side connector 34B. The first stator-side connector 34A and the second stator-side connector 34B are located with a prescribed distance kept therebetween and outer to the outer cylindrical section 32 (outside outer cylindrical section 32o), and connection openings thereof are directed in the same direction.

The stator-side connectors 34 (34A, 34B) are each connected to a cable (not shown) drawn from an electrical circuit or the like on the vehicle body side in a lower column cover (not shown).

As shown in FIG. 2 through FIG. 4, inside the cable housing 10a formed of the stator 30 and the rotator 20 which are assembled together in the rotation axis direction of the steering wheel, the fixed-side ring plate 31 of the stator 30 faces the rotatable-side ring plate 21 of the rotator 20 in the rotation axis direction, and the outer cylindrical section 32 of the stator 30 is located outer to the inner cylindrical section 22 of the rotator 20 in the radial direction and faces the inner cylindrical section 22. Thus, an accommodation space S is formed.

The accommodation space S accommodates the retainer 40 and the flat cables C.

As shown in FIG. 2 through FIG. 4, the retainer 40 includes a plurality of rotatable rollers 45 and a base ring 41. The retainer 40 is located on the bottom surface of the stator 30 which forms the accommodation space S and is rotatable, with the rotation axis of the rotator 20 being the rotation center.

The base ring 41 includes a plate-like base ring main body 42 having a ring shape as seen in a plan view, roller supporting projection sections 43, regulation sections 44, and an inversion regulation section 440.

The base ring main body 42 is located on the fixed-side ring plate 31 so as to be slidable in a rotation direction thereof and is rotatable with respect to the stator 30.

The roller supporting projection sections 43 are provided at an equal interval in a circumferential direction of the base ring main body 42, and project upward so as to be capable of axially supporting the rotatable rollers 45.

The regulation sections 44 are each provided between the roller supporting projection sections 43 adjacent to each other in the circumferential direction, and each have a generally concaved shape which is open radially outward as seen in a plan view so as to guide the flat cables C (inside wound part Ci of the flat cables C described later), which are wound along an outer circumferential surface of the inner cylindrical section 22 of the rotator 20, from a radially outer side. The regulation sections 44 each project upward with respect to the base ring main body 42.

The inversion regulation section 440 is located at a position which is distanced, by the flat cables C, from one of the plurality of rotatable rollers 45 along which the flat cables C (reversed part Cr of the flat cables C described later) are wound and project, in a shape different from that of the regulation sections 44, upward with respect to the base ring main body 42. The flat cables C (reversed part Cr of the flat cables C described later) are turned around in a U shape and wound along the one of the plurality of rotatable rollers 45.

To the inversion regulation section 440, the guide unit 460 for allowing the reversed part of the flat cables C to be pressed thereon is fit and fixed.

Specifically, with reference to FIG. 5 through FIG. 8, the inversion regulation section 440 includes an inner regulation section 441 and an outer wall section 442.

The inner regulation section 441 is located close to an inner circumference of the base ring main body 42, and has approximately the same shape as that of the regulation sections 44 so as to guide, from the radially outer side, the inside wound part Ci of the flat cables C wound along the outer circumferential surface of the inner cylindrical section 22 of the rotator 20. On a radially outer surface of the inner regulation section 441, holding sections 441a having approximately the same height as that of the inner regulation section 441 are formed. The holding sections 441a project radially outward and have a prescribed distance therebetween. The holding sections 441a are located closer to the reversed part Cr of the flat cables C than a circumferential-direction center of the inner regulation section 441 is.

The outer wall section 442 includes a radial-direction outer wall section 442a and a circumferential-direction outer wall section 442b. The radial-direction outer wall section 442a extends radially outward from the circumferential-direction center of the inner regulation section 441 by a length which is about the same as a diameter of the rotatable rollers 45. The circumferential-direction outer wall section 442b extends from a radial-direction outer end of the radial-direction outer wall section 442a toward the reversed part Cr at approximately the right angle.

On a radial-direction inner surface of the circumferential-direction outer wall section 442b, holding sections 442c having approximately the same height as that of the circumferential-direction outer wall section 442b are formed. The holding sections 442c are located at positions corresponding to the holding sections 441a and project radially inward.

On a part of the base ring main body 42 which is surrounded by the inner regulation section 441 and the outer wall section 442, as shown in FIG. 6, stop sections 443 each having a hooked top end project upward. The stop sections 443 are located at two positions which are away from each other in the radial direction. Between the inner regulation section 441 and the stop section 443, and between the circumferential-direction outer wall section 442b and the stop section 443, openings 443a are formed at the root of the stop sections 443.

As shown in FIG. 5, FIG. 7 and FIG. 8, the guide unit 460 includes a guide unit main body 461, a top fitting section 462 and bottom fitting sections 463.

The guide unit main body 461 is curved generally in an arc shape so as to be along the reversed part Cr as seen in a plan view, and has a height which is slightly smaller than that of the inversion regulation section 440. A guide surface 464 of the guide unit main body 461 faces the reversed part Cr of the flat cables C in a vertical cross-section which is vertical to a surface of the base ring main body 42. The guide surface 464 swells toward the reversed part Cr, and has a vertical cross-sectional shape including a planar part 464a which is generally vertical with respect to the base ring main body 42 and is planar. The planar part 464a is formed at a position facing a contact range 200 of the reversed part Or described later.

The top fitting section 462 extends from a top part of the guide unit main body 461 in a direction opposite to the guide surface 464. The top fitting section 462 is generally cylindrical and has a generally rectangular closed cross-section.

The bottom fitting sections 463 are two plate-like bodies extending from a bottom part of the guide unit main body 461 in the direction opposite to the guide surface 464. The bottom fitting sections 463 have a prescribed gap therebetween in the radial direction and each have a certain thickness. The bottom fitting sections 463 have ends which are bent at approximately the right angle in such directions that the ends do not face each other.

As shown in FIG. 7, a parting line L of a plurality of dies used to form the guide unit 460 by molding is set on the guide unit 460, at a position excluding the guide surface 464 and ends of the guide surface 464.

When the guide unit 460 having such a structure is inserted from above into the inversion regulation section 440, the holding sections 441a and 442c hold the top fitting section 462 and the bottom fitting sections 463 in the radial direction, and the stop sections 443 stop top ends of the bottom fitting sections 463. Thus, the guide unit 460 is fit and fixed to the inversion regulation section 440.

In this state, the openings 443a at the root of the stop sections 443 are closed by the bottom fitting sections 463.

The rotatable rollers 45 are provided by the same number as that of the roller supporting projection sections 43, and are axially supported by the roller supporting projection sections 43 respectively. The rotatable rollers 45 are each provided to be rotatable, with an axis parallel to the rotation axis of the rotator 20 being the rotation center.

Two flat cables C are accommodated in the accommodation space S, and are wound around therein in a layered state. The flat cables C electrically connect the first rotator-side connector 23A and the first stator-side connector 34A to each other, and also electrically connect the second rotator-side connector 23B and the second stator-side connector 34B to each other.

This will be described in more detail. One of the two layered flat cables C is connected to the first rotator-side connector 23A at one end in a length direction thereof and is connected to the first stator-side connector 34A at the other end.

The other of the two layered flat cables C is connected to the second rotator-side connector 23B at one end in the length direction thereof and is connected to the second stator-side connector 34B at the other end.

Such flat cables C are supported by the retainer 40 located to be rotatable with respect to the fixed-side ring plate 31 and is accommodated in a wound state in the accommodation space S in the cable housing 10a.

This will be described in more detail. The flat cables C are drawn into the accommodation space S from the first stator-side connector 34A and the second stator-side connector 34B respectively. As shown in FIG. 3 and FIG. 4, an outside wound part Co is formed which is wound along an inner circumferential surface of the outer cylindrical section 32 (inside outer cylindrical section 32i) of the stator 30 at a position outer to the retainer 40.

The two flat cables C are wound around in the accommodated space S in a layered state as described above, but in FIG. 3 and FIG. 5, such a structure is simplified and only one wound flat cable C is shown.

As represented by the two-dot chain line in FIG. 3, the flat cables C have the reversed part Cr in the middle thereof in the length direction. The reversed part Cr is turned around in a LT shape and wound along one of the plurality of rotatable rollers 45.

After this part, tip ends of the flat cables C in the length direction are formed to be the inside wound part Ci which is wound along an outer circumferential surface of the inner cylindrical section 22 of the rotator 20 at a position inner to the retainer 40. The flat cables C are finally drawn out of the accommodation space S and connected to the first rotator-side connector 23A and the second rotator-side connector 23B, respectively.

As shown in FIG. 8, the flat cables C are each a band-like flexible transmission line. The flat cables C each include a plurality of flat conductors 1 through 9 which are located parallel to each other at a prescribed pitch in a width direction thereof. The conductors 1 through 9 are located sequentially from a position farthest to the retainer 40 and are covered with an insulating cover Cb.

Among the conductors 1 through 9 included in the flat cable C, the following conductors are connected to the following electric components via the corresponding rotator-side connector 23. The conductor 2 is connected to a horn module (not shown), the conductor 4 is connected to an audio control module (not shown), the conductor 5 is connected to an air conditioner control module (not shown), and the conductors 8 and 9 are connected to an airbag module (not shown).

Priority levels are set for the conductors 1 through 9 such that as a conductor which is connected to a more important electric component and may hinder safe running of the vehicle if abraded or broken is assigned a higher level.

The conductors 2, 8 and 9 connected to the horn module and the airbag module, which are safety devices, are assigned the highest priority level. The conductors 4 and 5 connected to the audio control module and the air conditioner control module, which do not hinder the running even if being inoperable, are assigned the second highest priority level. The conductors 1, 3, 6 and 7 which are not connected to any electric component are assigned the third highest priority level.

In accordance with the priority levels thus set for the conductors 1 through 9, the following ranges are set. Ranges in which the conductors assigned the highest priority level and the conductor (s) adjacent thereto are located are set as contact avoiding ranges 100, which are prevented from contacting the guide surface 464. A range excluding the contact avoiding range 100 is set as a contact range 200. Therefore, in the flat cable C, a range from the top end in the width direction to the conductor 3 and a range from the conductor 7 to the bottom end in the width direction are the contact avoiding ranges 100. A range from the conductor 4 to the conductor 6 is the contact range 200.

Now, how the flat cables C and the retainer 40 inside the accommodation space S having the above-described structure are operated when the rotator 20 is rotated clockwise (X direction in FIG. 5) will be described.

By the rotation of the rotator 20 with respect to the stator 30, the outside wound part Co and the inside wound part Ci of the flat cables C are respectively wound and unwound, or vice versa, in the accommodation space S.

In this state, the reversed part Cr of the flat cables C is appropriately rotated together with the retainer 40 so as to follow the change of balance in the wound state between the outside wound part Co and the inside wound part Ci.

Namely, when the rotator 20 is rotated clockwise (X direction in FIG. 5), the inner wound part Ci is unwound, and the reversed part Cr of the flat cables C is pressed on the guide unit 460. By the pressing force, the retainer 40 is rotated clockwise so as to follow the rotation of the rotator 20. Along with the rotation of the retainer 40, the reversed part Cr is wound around the outer wound part Co.

In the vertical cross-section vertical to the surface of the base ring main body 42, the reversed part Cr of the flat cables C and the guide surface 464 of the guide unit 460 are in the state as shown in FIG. 8. Namely, the contact range 200 of the flat cables C is in line contact with the planar part 464a of the guide surface 464. The contact avoiding ranges 100 of the flat cables C are not in contact with the guide surface 464 at all.

Therefore, when the retainer 40 is rotated along with the rotation of the rotator 20, the reversed part Cr of the flat cables C is pressed on the guide unit 460, but the contact avoiding ranges 100 are not put into contact with the guide unit 460.

Owing to the above-described structure, the insulating cover Cb of the flat cables C can be prevented from being abraded in at least the contact avoiding ranges 100.

This will be described more specifically. The guide unit 460 is fit and fixed to the retainer 40; namely, the guide unit 460 is formed separately from the retainer 40. Owing to this, the guide unit 460 can have a shape having the guide surface 464, which is difficult in the case where the guide unit 460 is molded integrally with the retainer 40 as by a conventional method. Therefore, at least the contact avoiding ranges 100 of the reversed part Cr of the flat cables C can be prevented from contacting the guide surface 464.

For this reason, when the flat cables C are wound or unwound, there is no risk that the insulating cover Cr in the contact avoiding ranges 100 of the flat cables C is abraded as a result of rubbing against the guide surface 464. Thus, the conductors 2, 8 are 9 can be prevented from being broken.

The planar part 464a for allowing the reversed part Cr to be pressed thereon is provided so as to face the contact range 200 of the reversed part Cr. Owing to this, the guide unit 460 can catch the reversed part Cr of the flat cables C more stably, and can be prevented from contacting the contact avoiding ranges 100 of the flat cables C. Therefore, the risk that the insulating cover Cb of the flat cables C is abraded can be reduced in at least the contact avoiding ranges 100.

The parting line L of the molding dies is set on the guide unit main body 461 of the guide unit 460 excluding the guide surface 464 and ends of the guide surface 464. Owing to this, the parting line L is not on the guide surface 464 or the ends thereof. Therefore, molding burr or step which is likely to be generated on the parting line L of the guide unit 460 can be prevented from rubbing against the reversed part Cr of the flat cables C. Although apart of the reversed part Cr contacts the guide surface 464, an area of such a part which is close to the contact avoiding ranges 100 does not rub against the parting line L. Therefore, the risk that the insulating cover Cb of the flat cables C is abraded can be reduced in at least the contact avoiding ranges 100.

In addition, there is no possibility that the molding burr generated on the parting line L of the molding dies rubs against the reversed part Cr and comes off. Therefore, there is no risk that the flat cables C are wound and unwound while having the burr attached thereto and thus the insulating cover Cb of the flat cables C is broken.

The contact avoiding ranges 100 are determined in accordance with the priority levels set for the conductors 1 through 9 included in the flat cables C based on the type of electric components connected to the conductors via the rotator-side connectors 23. Owing to this, the ranges in which the conductors 2, 8 and 9 assigned the highest priority level are located, namely, the ranges in which the conductors 2, 8 and 9 connected to the highly important electric components are located, can be prevented from contacting the guide surface 464.

This will be described more specifically. The conductors 1 through 9 of the flat cables C are each assigned a priority level in accordance with how important the electric component connected thereto is for the running of the vehicle. Owing to this, the ranges in which the conductors 2, 8 and 9 assigned the highest priority level are located can be easily set as ranges which do not contact the guide surface 464.

In this manner, the contact avoiding ranges 100 can be set easily, and abrasion of the flat cables C can be avoided in ranges thereof where the conductors 2, 8 and 9 connected to the important electric components are located.

The guide unit 460 may be formed to have an inclining part such that the pressing force of the reversed part Cr does not escape and the retainer 40 is rotated smoothly.

The electric components connected to the flat cables C via the rotator-side connectors 23 may be each assigned a priority level in advance, so that the conductors 1 through 9 are each assigned the same priority level as that of the electric component connected thereto. In this manner, the same electric component or the electric component having the same role is always assigned the same priority level. Thus, the conductors 1 through 9 are prevented from being assigned a wrong priority level.

The contact avoiding ranges 100 and the contact range 200 do not need to be set from a conductor to another conductor. For example, the contact range 200 may be from a position between the conductors 3 and 4 to a position between the conductors 7 and 8.

The rotatable connector device according to the present invention corresponds to the steering roll connector 10 in the embodiment; and in the same manner, the prescribed range corresponds to the contact avoiding range 100; and the electric part corresponds to the airbag module, the horn module, the audio control module, the air conditioner control module, or the electric component.

However, the present invention is not limited to the above-described embodiment, and can be implemented in many other embodiments.

Figure 9:
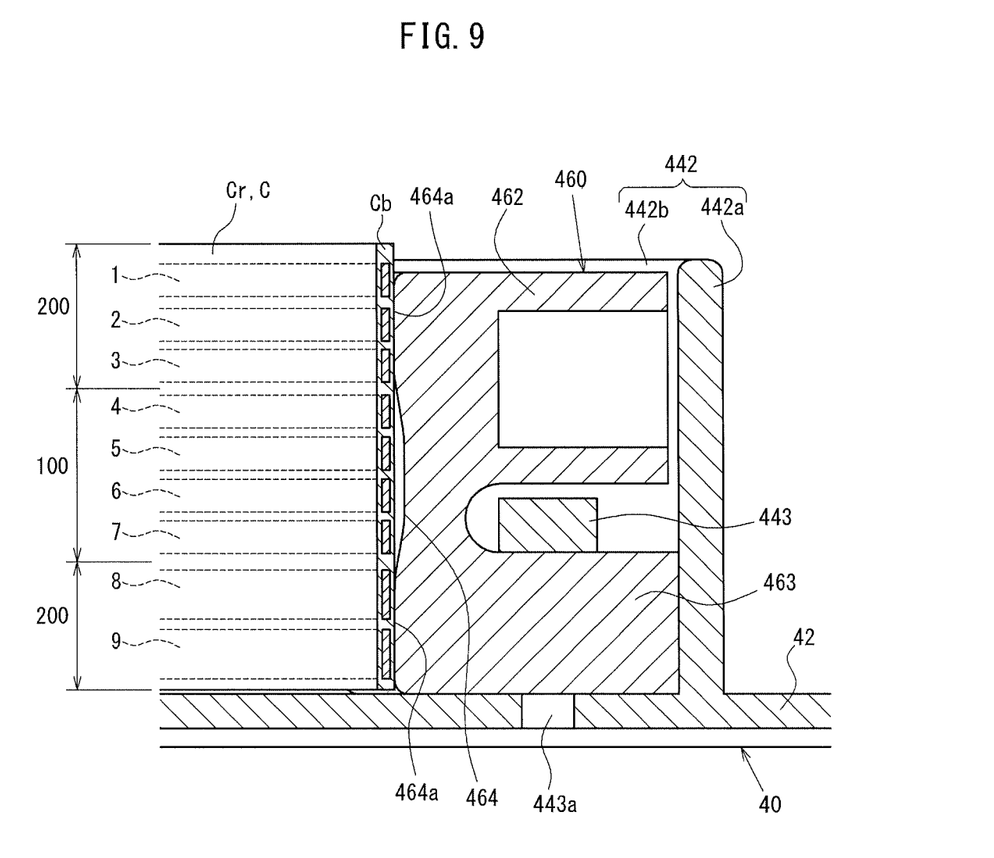
FIG. 9 is a cross-sectional view showing a vertical cross-sectional shape in another embodiment.

FIG. 9 is a cross-sectional view showing a vertical cross-sectional shape in another embodiment. As shown in FIG. 9, in the case where the contact avoiding range 100 of the flat cables C is from a position between the conductors 3 and 4 to a position between the conductors 7 and 8, the vertical cross-sectional shape of the guide surface 464 may have a generally concaved shape having a recess in a middle part and having planar parts 464a formed in a top part and a bottom part of the guide surface 464.

Figure 10:
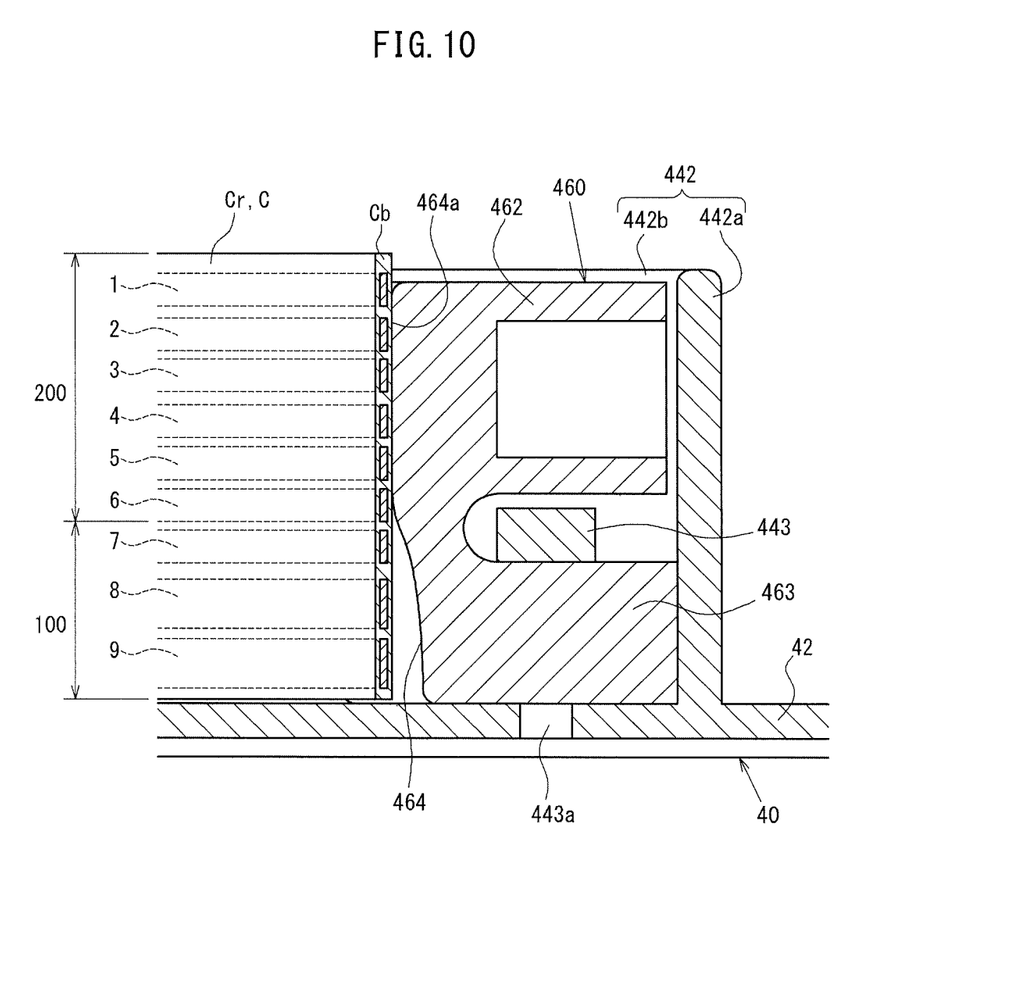
FIG. 10 is a cross-sectional view showing a vertical cross-sectional shape in still another embodiment.

FIG. 10 is a cross-sectional view showing a vertical cross-sectional shape in still another embodiment. As shown in FIG. 10, in the case where the contact avoiding range 100 of the flat cables C is from the conductor 7 to the bottom end of the flat cables C, the vertical cross-sectional shape of the guide surface 464 may have a planar part 464a in a top part and also have a bottom recessed part which is recessed so as to be away from the reversed part Cr.

The guide unit 460 having such a shape is difficult to be formed integrally with the retainer 40 so as to project from the surface thereof as by a conventional method. The guide unit 460 is formed separately from the retainer 40, and therefore may have such a complicated shape.

The guide unit 460 merely needs to be fit and fixed to the retainer 40 and does not need to be completely separate from the retainer 40. For example, the guide unit 460 may be formed as being coupled to the retainer 40 by a thin band-like member and put into a folded state to be fit and fixed to the retainer 40.

REFERENCE SIGNS LIST 1 through 9 . . . Conductor
10 . . . Steering roll connector
20 . . . Rotator
21 . . . Rotatable-side ring plate
22 . . . Inner cylindrical section
30 . . . Stator
31 . . . Fixed-side ring plate
32 . . . Outer cylindrical section
40 . . . Retainer
45 . . . Rotatable roller
100 . . . Contact avoiding range
200 . . . Contact range
460 . . . Guide unit
464 . . . Guide surface
Cr . . . Reversed part
C . . . Flat cable
L . . . Parting line
S . . . Accommodation space

The invention claimed is:

1. A rotatable connector device, comprising:
a rotator including a ring-shaped rotatable-side ring plate and an inner cylindrical section having a cylindrical shape and formed along an inner circumferential edge of the rotatable-side ring plate, and a stator including a ring-shaped fixed-side ring plate and an outer cylindrical section having a cylindrical shape and formed along an outer circumferential edge of the fixed-side ring plate, the rotator and the stator being fit to each other so as to be rotatable with respect to each other in a clockwise direction and a counterclockwise direction;
wherein:
an accommodation space is defined by the rotatable-side ring plate and the inner cylindrical section of the rotator and the fixed-side ring plate and the outer cylindrical section of the stator;
a ring-shaped retainer for axially supporting a plurality of rotatable rollers is located on a bottom surface of the accommodation space;

in a part of the accommodation space above the retainer, a flat cable for electrically connecting the rotator and the stator to each other, the flat cable having a reversed part which is wound along one of the plurality of rotatable rollers and has a winding direction thereof reversed, are accommodated along the rotatable rollers, such that the flat cable is wound and rewound;

a guide unit for allowing the reversed part to be pressed thereon is fit and fixed to the retainer; and in a vertical cross-section vertical to a planar surface of the retainer, a guide surface of the guide unit which faces the reversed part has a vertical cross-sectional shape which does not contact with at least a prescribed range of the flat cable in a width direction of the flat cable.

2. The rotatable connector device according to claim 1, wherein:

the prescribed range is a non-contact range;

a range of the flat cable excluding the non-contact range in the width direction is set as a contact range;

the vertical cross-sectional shape of the guide surface facing the contact range of the reversed part is formed to be a plane which is in line contact with the reversed part and is generally vertical to the top surface of the retainer; and the generally vertical plane of the guide surface is formed to swell toward the flat cable.

3. The rotatable connector device according to claim 1, wherein a parting line of a plurality of dies used to form the guide unit by molding is set on a guide unit main body excluding at least the guide surface and ends of the guide surface.

4. The rotatable connector device according to claim 2, wherein a parting line of a plurality of dies used to form the guide unit by molding is set on a guide unit main body excluding at least the guide surface and ends of the guide surface.

5. The rotatable connector device according to any one of claim 1, wherein:

a plurality of conductors included in each of the flat cable are each assigned a priority level in accordance with an electric part electrically connected to the respective conductor;

the conductors are located in accordance with the priority levels; and the non-contact range is set to a range in which the conductors having higher priority levels are located.

6. The rotatable connector device according to any one of claim 2, wherein:

a plurality of conductors included in each of the flat cable are each assigned a priority level in accordance with an electric part electrically connected to the respective conductor;

the conductors are located in accordance with the priority levels; and the non-contact range is set to a range in which the conductors having higher priority levels are located.

7. The rotatable connector device according to any one of claim 3, wherein:

a plurality of conductors included in each of the flat cable are each assigned a priority level in accordance with an electric part electrically connected to the respective conductor;

the conductors are located in accordance with the priority levels; and the non-contact range is set to a range in which the conductors having higher priority levels are located.

8. The rotatable connector device according to any one of claim 4, wherein:

a plurality of conductors included in each of the flat cable are each assigned a priority level in accordance with an electric part electrically connected to the respective conductor;

the conductors are located in accordance with the priority levels; and the non-contact range is set to a range in which the conductors having higher priority levels are located.

\* \* \* \* \*